(12) United States Patent
Zhao et al.

(10) Patent No.: US 10,330,847 B2
(45) Date of Patent: Jun. 25, 2019

(54) LIGHT GUIDE PLATE, MANUFACTURING METHOD OF THE SAME AND BACKLIGHT MODULE

(71) Applicants: BOE TECHNOLOGY GROUP CO., LTD., Beijing (CN); FUZHOU BOE OPTOELECTRONICS TECHNOLOGY CO., LTD, Fuzhou, Fujian (CN)

(72) Inventors: Hongyu Zhao, Beijing (CN); Kai Diao, Beijing (CN); Zongjie Bao, Beijing (CN); Han Zhang, Beijing (CN); Ming Li, Beijing (CN); Wenjia Sun, Beijing (CN); Yang Chu, Beijing (CN); Junjie Guo, Beijing (CN)

(73) Assignees: BOE TECHNOLOGY GROUP CO., LTD., Beijing (CN); FUZHOU BOE OPTOELECTRONICS TECHNOLOGY CO., LTD, Fuzhou (CN)

( * ) Notice: Subject to any disclaimer, the term of this patent is extended or adjusted under 35 U.S.C. 154(b) by 0 days.

(21) Appl. No.: 15/833,602

(22) Filed: Dec. 6, 2017

(65) Prior Publication Data
US 2018/0313999 A1    Nov. 1, 2018

(30) Foreign Application Priority Data
Apr. 28, 2017    (CN) .......................... 2017 1 0296132

(51) Int. Cl.
*G02B 6/00*    (2006.01)
*F21V 8/00*    (2006.01)

(52) U.S. Cl.
CPC ........... *G02B 6/0038* (2013.01); *G02B 6/009* (2013.01); *G02B 6/0045* (2013.01); *G02B 6/0055* (2013.01); *G02B 6/0065* (2013.01); *G02B 6/0068* (2013.01); *G02B 6/0073* (2013.01); *G02B 6/0088* (2013.01); *G02B 6/0091* (2013.01)

(58) Field of Classification Search
CPC .. G02B 6/0038; G02B 6/0045; G02B 6/0055; G02B 6/0065; G02B 6/0088; G02B 6/009; G02B 6/0091
USPC ......................................... 235/606; 362/606
See application file for complete search history.

(56) References Cited

U.S. PATENT DOCUMENTS

2009/0185389 A1*  7/2009  Tessnow .............. G02B 6/0038
                                                     362/516
2017/0160463 A1*  6/2017  You ...................... G02B 6/0038

FOREIGN PATENT DOCUMENTS

| CN | 101886785 A | 11/2010 |
| CN | 103855268 A | 6/2014 |
| CN | 105242343 A | 1/2016 |

(Continued)

OTHER PUBLICATIONS

CN Office Action for CN Appl. No. 201710296132.7, dated Nov. 7, 2018.

*Primary Examiner* — Daniel A Hess
(74) *Attorney, Agent, or Firm* — Foley & Lardner LLP; James F. Ewing; Paul M. H. Pua

(57) ABSTRACT

The present disclosure relates to a light guide plate and its manufacturing method, and a backlight module. The light guide plate includes two opposite main surfaces and a side surface located between the two main surfaces. The method comprises: forming a plurality of grooves on at least one main surface of the light guide plate.

16 Claims, 4 Drawing Sheets

(56) References Cited

FOREIGN PATENT DOCUMENTS

CN       205982704 U     2/2017
KR    20120135651 A   12/2012

* cited by examiner

LIGHT GUIDE PLATE, MANUFACTURING METHOD OF THE SAME AND BACKLIGHT MODULE

CROSS-REFERENCE TO RELATED APPLICATION

This application claims benefits of Chinese Patent Application No. 201710296132.7, filed on Apr. 28, 2017, which is incorporated herein by reference and used for all purpose.

TECHNICAL FIELD

At least one embodiment of the present disclosure relates to a light guide plate, its manufacturing method, and a backlight module.

BACKGROUND

Nowadays, the curved display screen is more and more popular because of its unique user experience. Meanwhile users have higher and higher requirements for the curvature of the curved display screen.

A curved light guide plate, as a structure in a curved display screen, is currently obtained through bending a planar light guide plate by force. The resulting curved light guide plate itself may produce a greater stress, which may increase a friction force between the curved light guide plate and its peripheral members, likely causing scratches on the light guide plate and in turn impacting the display effect.

SUMMARY

At least one embodiment of the present disclosure provides a method for manufacturing a light guide plate. The light guide plate comprises two opposite main surfaces and a side surface located between the two main surfaces, wherein the method comprises: forming a plurality of grooves on at least one main surface of the light guide plate.

The method for manufacturing a light guide plate according to at least one embodiment of the present disclosure may further comprise: forming a curable filling adhesive on the main surface on which the grooves are formed; wherein the grooves are at least partially filled with the filling adhesive.

The method for manufacturing a light guide plate according to at least one embodiment of the present disclosure may further comprise: curing the filling adhesive and bending the light guide plate to form a curved light guide plate, wherein one main surface of the light guide plate forms a concave surface of the curved light guide plate and the other main surface of the light guide plate forms a convex surface of the curved light guide plate.

In the method for manufacturing a light guide plate according to at least one embodiment of the present disclosure, curing the filling adhesive and bending the light guide plate to form a curved light guide plate may comprise: bending the light guide plate after curing the filling adhesive to form the curved light guide plate, wherein the filling adhesive comprise an elastomeric material.

In the method for manufacturing a light guide plate according to at least one embodiment of the present disclosure, curing the filling adhesive and bending the light guide plate to form a curved light guide plate may comprise: curing the filling adhesive after bending the light guide plate to form the curved light guide plate.

In the method for manufacturing a light guide plate according to at least one embodiment of the present disclosure, the grooves are formed on the concave surface of the light guide plate, and/or the grooves are formed on the convex surface of the light guide plate.

In the method for manufacturing a light guide plate according to at least one embodiment of the present disclosure, a difference in refractive index between the light guide plate and the filling adhesive is not greater than 0.1.

In the method for manufacturing a light guide plate according to at least one embodiment of the present disclosure, in a direction perpendicular to the main surface, a ratio of the depth of the groove to the thickness of the light guide plate is ½-⅔.

In the method for manufacturing a light guide plate according to at least one embodiment of the present disclosure, the curable filling adhesive is a UV curing adhesive or a heat curing adhesive.

At least one embodiment of the present disclosure provides a light guide plate, the light guide plate comprising two opposite main surfaces and a side surface located between the two main surfaces, wherein at least one main surface of the light guide plate is provided with a plurality of grooves.

In the light guide plate according to at least one embodiment of the present disclosure, in a direction perpendicular to the main surface of the light guide plate, the cross section of the groove is in a V-shape, a trapezoid or a rectangle shape, or a combination thereof; and/or in a direction parallel to the main surface of the light guide plate, the groove extends in a straight line or a curve shape.

The light guide plate according to at least one embodiment of the present disclosure further comprises a filling adhesive, wherein the filling adhesive is provided on the main surface on which the grooves are formed on the light guide plate, and the grooves are at least partially filled with the filling adhesive.

In the light guide plate according to at least one embodiment of the present disclosure, the filling adhesive comprises an elastomeric material.

In the light guide plate according to at least one embodiment of the present disclosure, the light guide plate may be configured to be a curved light guide plate, wherein one of the two main surfaces of the light guide plate is a concave surface of the curved light guide plate and the other one of the two main surfaces of the light guide plate is a convex surface of the curved light guide plate.

At least one embodiment of the present disclosure provides a backlight module. The backlight module may comprise a light source and a light guide plate according to any one of the above embodiments, wherein the light source is disposed opposite to a side surface of the light guide plate, and opposite to a cross section of the groove, the cross section of the groove being a cross section of the groove in a direction perpendicular to the extension direction of the light guide plate on the main surface.

In the backlight module according to at least one embodiment of the present disclosure, the light guide plate further comprises a filling adhesive, and wherein the filling adhesive is provided on the main surface of the light guide plate on which the grooves are formed, and the grooves are at least partially filled with the filling adhesive.

In the backlight module according to at least one embodiment of the present disclosure, the filling adhesive comprises an elastomeric material.

The backlight module according to at least one embodiment of the present disclosure may further comprise a scattering pattern provided on the main surface opposite to a light exiting surface of the light guide plate.

The backlight module according to at least one embodiment of the present disclosure may further comprise a reflective layer provided on the main surface opposite to a light exiting surface of the light guide plate.

The backlight module according to at least one embodiment of the present disclosure may further comprise an optical film layer provided on the side of the curved light guide plate on which a light exiting surface is located.

At least one embodiment of the present disclosure provides a light guide plate with a plurality of grooves provided on a main surface thereof, which can reduce a stress produced by the light guide plate after it is bent, reduce the risk of scratching the light guide plate, and improve the display effect.

BRIEF DESCRIPTION OF THE DRAWINGS

For a more clear illustration of the technical solutions of the embodiments of the present disclosure, a brief description of the drawings of the embodiments will be given below. It should be noticed that the following description of the drawings merely involve some embodiments of the present disclosure, and is not a limitation of the present disclosure.

FIG. 2b is a sectional view of the light guide plate taken along A-B shown in FIG. 2a;

DETAILED DESCRIPTION

In order to make the objectives, technical schemes and advantages of the embodiments of the present invention more clear, a clear and complete description will be given below for the technical solutions of the embodiments of the present invention with reference to the drawings. Obviously, embodiments described are only some embodiments of the present disclosure, and are not all of embodiments thereof. All other embodiments obtained by persons of ordinary skill in the art based on the embodiments of the present disclosure without creative efforts shall fall within the protection scope of the present disclosure.

Unless defined otherwise, all technical and scientific terms used herein have the same meaning as commonly understood by one of ordinary skill in the art to which the embodiments of the invention belong. The use of the terms "first", "second" or the like in the present disclosure does not denote any order, quantity or importance, but are merely used to distinguish between different components. The terms "comprise", "include" and the like mean that the elements or objects preceding the term cover the elements or objects listed after the term and their equivalents, without excluding other elements or objects. The terms "connect", "connecting" and the like are not limited to physical or mechanical connections, but may include electrical connections, regardless of whether the connections are direct or indirect connections. The terms "up", "down", "left", "right" and the like are used only to represent a relative positional relationship, and the relative positional relationship may be changed if the absolute position of the described object changes.

Figure 1:
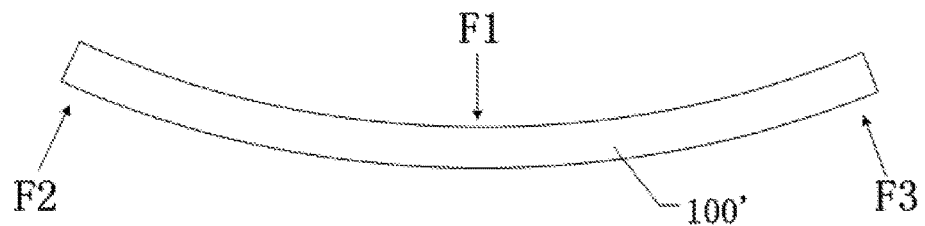
FIG. 1 is a schematic force diagram of a light guide plate in a bent state.

FIG. 1 is a schematic force diagram of a light guide plate in a bent state. For example, through applying forces F1, F2 and F3 on a light guide plate 100', the light guide plate 100' is bent to obtain a curved light guide plate. The larger curvature of bent light guide plate 100', the larger forces F1, F2, F3 to be applied are. In this situation, the light guide plate 100' is subjected to a greater stress after bending, and a friction force produced between the light guide plate 100' and its peripheral members (for example, the members for mounting the light guide plate) when a relative displacement occurs therebetween may increase, so that the light guide plate 100' is more likely to be scratched, resulting in poor display quality such as white spots on the display screen.

At least one embodiment of the present disclosure provides a light guide plate, its manufacturing method, and a backlight module to solve the above technical problem. The light guide plate comprises two opposite main surfaces and a side surface located between the two main surfaces, wherein the method for manufacturing the light guide plate comprises: forming a plurality of grooves on at least one main surface of the light guide plate. The plurality of grooves formed on the main surface of the light guide plate can reduce a stress produced by the light guide plate after it is bent, thereby reducing the risk of scratching the light guide plate, and improving the display effect.

Below, the light guide plate and its manufacturing method, the backlight module according to the embodiments of the present disclosure will be described in detail with reference to the drawings.

Figure 2A:
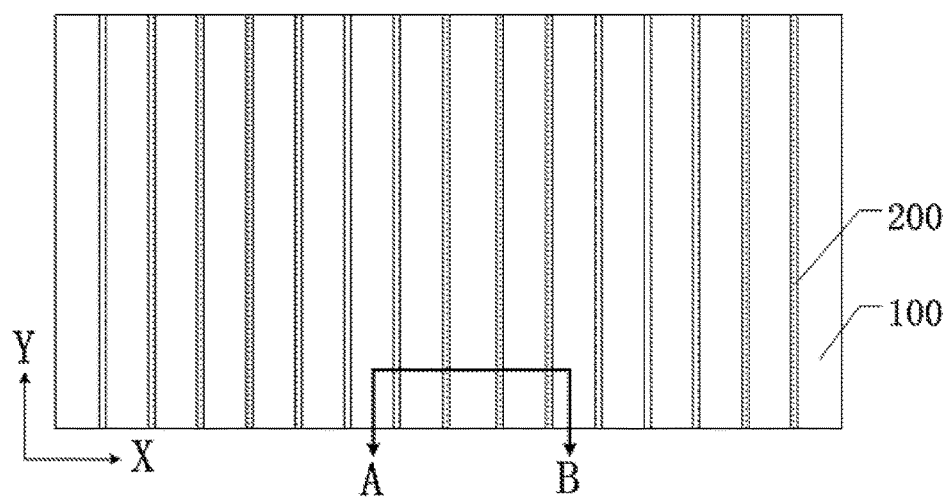
FIG. 2a is a plan view of a light guide plate according to an embodiment of the present disclosure.
Figure 2B:
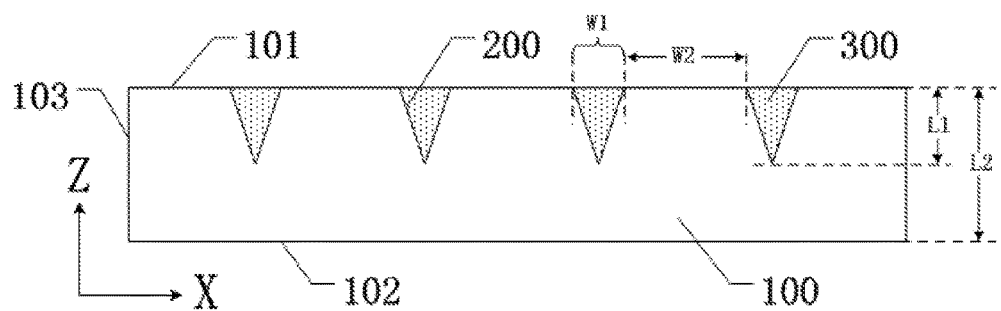

There is provided a light guide plate according to at least one embodiment of the present disclosure. FIG. 2a is a plan view of the light guide plate according to an embodiment of the present disclosure, and FIG. 2b is a sectional view of the light guide plate taken along A-B shown in FIG. 2a. For example, as shown in FIGS. 2a and 2b, the light guide plate comprises two opposite main surfaces, for example, a first main surface 101 and a second main surface 102, and a side surface located between the two main surfaces, at least one main surface of the light guide plate being provided with a plurality of grooves 200. The provision of the grooves 200 can reduce an effective thickness contributing to a stress produced when the light guide plate 100 is bent, equivalent to thinning the portion of the light guide plate 100 which generates the stress, so that the stress produced when the light guide plate 100 is bent can be reduced.

For example, as shown in FIG. 2b, in the direction indicated by the Z axis (i.e., in the direction perpendicular to the main surface of the light guide plate 100), the depth of the groove 200 is L1 and the thickness of the light guide plate 100 is L2. Without providing grooves 200 on the light guide plate 100, the light guide plate 100 having the thickness L2 produces a stress by deformation; in the case of providing grooves 200 having a depth L1 on the light guide plate 100, when the light guide plate 100 is bent, the stress is mainly produced by a portion having a thickness (L2-L1) of the light guide plate 100. Since the grooves 200 can reduce the effective thickness contributing to the stress produced when the light guide plate 100 is bent, the stress produced when the light guide plate 100 is bent can also be reduced.

For example, in at least one embodiment of the present disclosure, the light guide plate 100 may be made of a high transmittance acrylic material. For example, the material of the light guide plate 100 may comprise polymethylmethacrylate (PMMA), polyethylene terephthalate (PET) or methyl methyl acrylate-styrene copolymer (MS), etc. In addition, the shape of the light guide plate 100 is not limited to a rectangle as shown in FIGS. 2a and 2b, and may be, for example, a circular, fan, triangular, polygonal shape and the like. For the convenience of description, the technical solution of the embodiments of the present disclosure will be described with an example, in which the shape of the light guide plate 100 is a rectangle.

Note that, in the embodiments of the present disclosure, there is no limitation to the distribution of the grooves on the light guide plate 100, so long as the provision of the grooves can reduce the stress produced when the light guide plate 100 is bent. For the convenience of understanding, as shown in FIGS. 2a and 2b, the technical solution of the present disclosure will be described with an example, in which adjacent grooves 200 are disposed parallel to each other, and the grooves extend through the main surface of the light guide plate 100 in an extension direction parallel to the Y axis.

For example, in at least one embodiment of the present disclosure, in a direction perpendicular to the main surface of the light guide plate 100 and perpendicular to the extension direction of the grooves 200 on the main surface of the light guide plate 100, the cross section of the groove 200 is in a V-shape, a trapezoid or a rectangle shape, or a combination thereof. Embodiments of the present disclosure include, but are not limited thereto. For example, in at least one embodiment of the present disclosure, as shown in FIGS. 2a and 2b, in a direction perpendicular to the main surface of the light guide plate 100 and perpendicular to the extension direction of the grooves 200 on the main surface of the light guide plate 100, the cross section of the groove 200 is in a V-shape. When the light guide plate 100 is bent, the grooves will be pressed and the width W1 of the opening thereof may be narrowed or closed, so that no impact is produced on the display effect of the product (for example, a display apparatus comprising the light guide plate of the embodiment of the present disclosure). Further, the region of the light guide plate 100 on which the grooves 200 are provided has the increased capability of light scattering, so that the shielding property of the light guide plate 100 can be improved.

In the embodiments of the present disclosure, the grooves 200 are provided on the light guide plate 100 in such a manner that the stress produced when the light guide plate 100 is bent is reduced while preventing a too large depth of the grooves 200 which may cause the light guide plate 100 to be broken when it is bent. For example, in at least one embodiment of the present disclosure, as shown in FIG. 2b, in a direction perpendicular to the main surface of the light guide plate 100, i.e., in the Z-axis direction, a ratio of the depth L1 of the grooves 200 to the thickness L2 of the light guide plate 100 may be ⅓-⅔. Note that the depth of the grooves is not limited to the range described above, and its particular value can be determined according to practical needs, so long as the depth of the grooves 200 can reduce the stress produced when the light guide plate 100 is bent without causing the light guide plate 100 to be broken.

For example, in at least one embodiment of the present disclosure, as shown in FIG. 2b, in a direction perpendicular to the main surface of the light guide plate 100 and perpendicular to the extension direction of the grooves 200 on the main surface of the light guide plate 100, i.e., in the X-axis direction, the width W1 of the grooves may be in a range of 5-15 μm, and the spacing W2 between adjacent grooves 200 is not greater than 100 μm. In this way, the provision of the grooves 200 can guarantee the optical performance of the light guide plate 100 while reducing the stress produced when the light guide plate 100 is bent.

For example, in at least one embodiment of the present disclosure, as shown in FIG. 2b, the light guide plate 100 may further comprise a filling adhesive 300, wherein the filling adhesive 300 is disposed on the main surface of the light guide plate 100 on which the grooves 200 are provided, and the grooves 200 are at least partially filled with the filling adhesive 300. Through filling the space formed by the grooves 200 with the filling adhesive 300, in one aspect, the filling adhesive 300 can be used as a light transmission medium of the light guide plate 100, which can preserve the continuity of the optical characteristics of the light guide plate 100 at the position where the grooves 200 are located. In another aspect, the filling adhesive 300 can improve the flexibility of the light guide plate 100 so that the light guide plate 100 is more easily to be bent. In still another aspect, the filling adhesive 300 can keep the light guide plate 100 in the bent state and reduce the stress produced when the light guide plate 100 is bent. In still another aspect, the filling adhesive 300 as a filling can prevent the light guide plate 100 from being broken when it is bent. For example, the refractive index of the filling adhesive 300 is the same or close to the refractive index of the light guide plate 100 to preserve the uniformity and continuity of the optical performance of the light guide plate 100 so as to avoid a deviation in the propagation direction of the light at the interface between the filling adhesive 300 and the light guide plate 100. For example, in at least one embodiment of the present disclosure, a difference in refractive index between filling adhesive 300 and the light guide plate 100 is not greater than 0.1. For example, the refractive index of the light guide plate 100 may be in a range of 1.4-1.52, and the refractive index of the filling adhesive 300 may be in a range of 1.4-1.55.

Note that partially filling the grooves 200 with the filling adhesive 300 may be interpreted as: (1) for a plurality of grooves, filling some or all of the grooves 200 with the filling adhesive 300; or (2) for each groove 200 to be filled, filling a portion of or all of the groove 200 with the filling adhesive 300. For example, each of the plurality of grooves 200 is filled with the filling adhesive 300, and each groove 200 is completely filled with the filling adhesive 300.

For example, the filling adhesive 300 may be a curable material, for example, a UV curing adhesive (UV glue), a heat curing adhesive or other materials.

For example, in at least one embodiment of the present disclosure, the filling adhesive 300 may comprise an elastomeric material, including a polyester elastomer, for example. The filling adhesive 300 is elastic so that the light guide plate 100 is more easily to be bent, with a curvature that may be changed in a larger range, resulting in a less stress produced after the light guide plate 100 is bent.

Note that, in the embodiments of the present disclosure, there is no limitation to the shape in which the groove 200 extends on the main surface of the light guide plate 100. The shape in which the groove 200 extends on the main surface of the light guide plate 100 is the shape of the cross section of the groove 200 in a direction parallel to the main surface of the light guide plate 100.

For example, in at least one embodiment of the present disclosure, as shown in FIG. 2a, in a direction parallel to the main surface of the light guide plate 100, i.e., along the Y-axis direction, the shape in which the groove 200 extends may be a linear shape.

Figure 3:
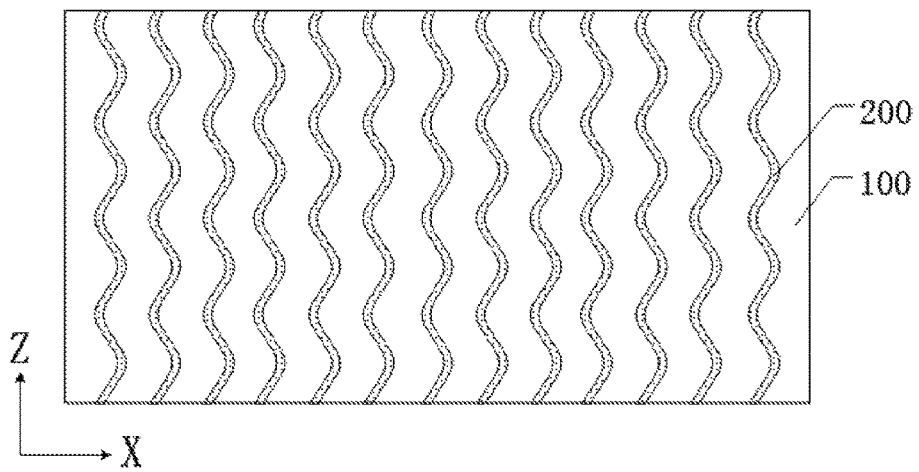
FIG. 3 is a plan view of another light guide plate according to an embodiment of the present disclosure.

For example, in at least one embodiment of the present disclosure, FIG. 3 is a plan view of another light guide plate according to an embodiment of the present disclosure. For example, as shown in FIG. 3, in a direction parallel to the main surface of the light guide plate 100, i.e., along the Y-axis direction, the shape in which the groove 200 extends may be a curve shape.

The shape in which the groove 200 extends on the main surface of the light guide plate 100 is not limited to at least one of the linear shape or curve shape shown in FIGS. 2a and 3 or a combination thereof. Other shapes are also possible and the present disclosure is not limited thereto. For the convenience of description, the technical solution of the embodiments of the present disclosure will be described with an example, in which the shape in which the groove 200 extends along the Y axis is a linear shape.

Figure 4:
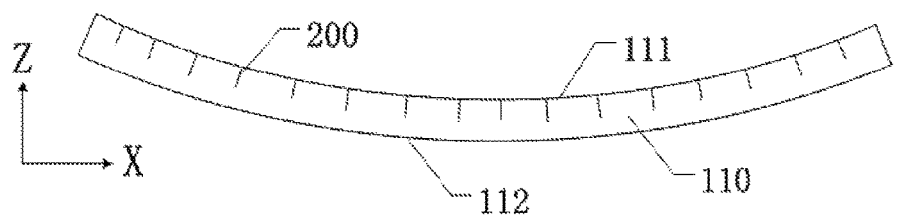
FIG. 4 is a sectional view of a curved light guide plate according to an embodiment of the present disclosure.

For example, in at least one embodiment of the present disclosure, the light guide plate 100 may be constructed as a curved light guide plate. FIG. 4 is a sectional view of a curved light guide plate according to an embodiment of the present disclosure. For example, as shown in FIG. 4, in at least one embodiment of the present disclosure, the light guide plate 100 shown in FIG. 2 may be configured as a curved light guide plate 110, wherein the first main surface 101 of the light guide plate 100 is a concave surface 111 of the curved light guide plate 110, and the second main surface 102 of the light guide plate 100 is a convex surface of the curved light guide plate 110. However, the embodiments of the present application are not limited thereto. The first main surface 101 of the light guide plate 100 may be the convex surface of the curved light guide plate 110, and the second main surface 102 of the light guide plate 100 may be the concave surface of the curved light guide plate 110.

Figure 5:
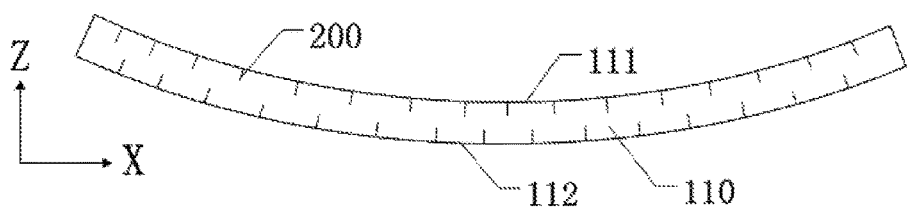
FIG. 5 is a sectional view of another curved light guide plate according to an embodiment of the present disclosure.

FIG. 5 is a sectional view of another curved light guide plate according to an embodiment of the present disclosure. For example, in at least one embodiment of the present disclosure, as shown in FIG. 5, the grooves 200 may be provided on the concave surface 111 of the curved light guide plate 110, or the grooves 200 may also be provided on the convex surface 112 of the curved light guide plate 110, or the grooves 200 may be provided on both of the concave surface 111 and the convex surface 112 of the curved light guide plate 110. The position in which the grooves 200 are provided is independent to the bending direction of the curved light guide plate 110, as in either case the stress produced in the curved light guide plate 110 can be reduced. For example, in at least one embodiment of the present disclosure, the width W1, the spacing W2 and other parameters can be designed according to the curvature of the curved light guide plate 110. For example, the grooves 200 in a position where the curvature of the curved light guide plate 110 is smaller may have a smaller width W1 and a larger spacing W2. The grooves 200 in a position where the curvature of the curved light guide plate 110 is larger may have a larger width W1 and a smaller spacing W2.

At least one embodiment of the present disclosure provides a backlight module comprising the light guide plate according to any embodiment described above.

For example, in at least one embodiment of the present disclosure, the backlight module may further comprise a light source. There is no limitation in the way of providing the light source in the embodiments of the present disclosure, so long as the light guide plate in the backlight module can provide light. For example, in at least one embodiment of the present disclosure, the light source in the backlight module may be configured as a straight-down light source or a side-entry light source.

Figure 6A:
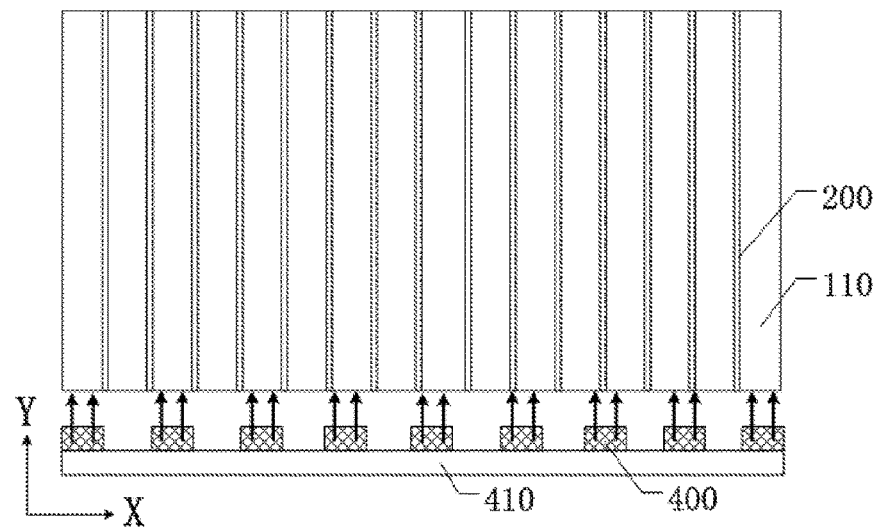
FIG. 6a is a plan view of a backlight module according to an embodiment of the present disclosure.

In a case that the light source is a configured as a side-entry light source, the light source can be configured to be disposed to face any side surface of the light guide plate 110, so long as the light source can provide light to the light guide plate, and there in no limitation on the particular position where the light source is according to the embodiments of the present disclosure. FIG. 6a is a plan view of a backlight module according to an embodiment of the present disclosure. For example, as shown in FIG. 6a, the light source 400 in the backlight module can be disposed opposite to a side surface of the light guide plate 100, and further the light source 400 may be opposite to the cross section of the groove 200, which is a cross section in the direction perpendicular to the main surface of the light guide plate 100 and perpendicular to the extension direction of the grooves 200 on the main surface of the light guide plate 100. The above way of disposing the light source 400 shown in FIG. 6a enables a more uniform distribution of light emitted from the light source 400 in the curved light guide plate 110, which is less affected by the grooves 200.

For example, the light source 400 may be composed of a plurality of sub light sources. The sub light sources may be organic light-emitting diodes. The light source 400 for example may be disposed on the support unit 410. For example, the support unit 410 is made of a flexible material, so that the support unit 410 may have the same curvature as that of the light guide plate 110 when the light guide plate 100 is bent.

Note that the light source 400 may be configured as a straight down light source. For example, the light source 400 may be disposed opposite to the concave surface 111 or the convex surface 112 of the curved light guide plate 110.

For example, in the embodiments of the present disclosure, the concave surface 111 of the curved light guide plate 110 may be a light exiting surface, that is, the curved light guide plate 110 may be used in a display apparatus having a concave display surface; or the convex surface 112 of the curved light guide plate 110 may be a light exiting surface, that is, the curved light guide plate 110 may be used in a display apparatus having a convex display surface. For the convenience of description, the technical solution of the embodiment of the present disclosure will be described with an example, in which the concave surface 111 of the curved light guide plate 110 is a light exiting surface and the convex surface 112 of the curved light guide plate 110 is a main surface opposite to the light exiting surface 111.

Figure 6B:
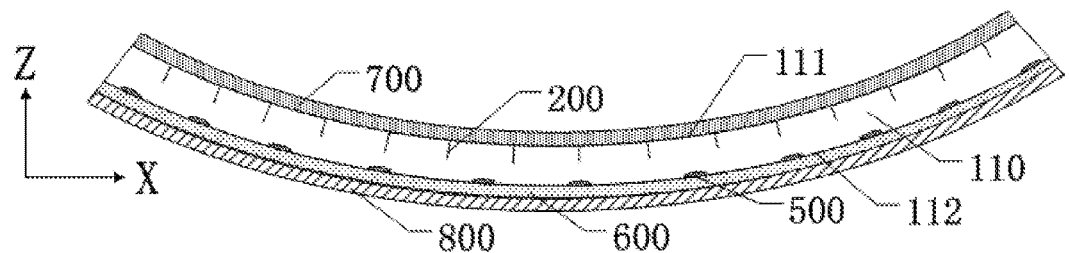
FIG. 6b is a sectional view of the backlight module shown in FIG. 6a, which is in a bent state.

FIG. 6b is a sectional view of the backlight module shown in FIG. 6a, which is in a bent state. As shown in FIG. 6b, in at least one embodiment of the present disclosure, the backlight module may further comprise a scattering pattern 500 provided on the main surface 112 opposite to the light exiting surface 111 of the curved light guide plate 110. The scattering pattern 500 may increase the scattering of light so that light can be emitted from the light exiting surface 111 of the light guide plate 110 in a more uniform manner. The scattering pattern 500 can be formed on the main surface 112 of the light guide plate 110 through printing, or a layer of film with a scattering pattern 500 may be attached to the main surface 112 of the light guide plate 110.

During the transmission of light in the light guide plate 110, the luminance thereof is attenuated. In the embodiments of the present disclosure, for example, the distribution density of the scattering pattern 500 increases as the distance to the light source 400 increases. In this way, the uniformity of light exiting from the light guide plate 110 may be improved. For example, in at least one embodiment of the present disclosure, as shown in FIG. 6b, the backlight module may further comprise a reflective layer 600 provided on the main surface 112 opposite to the light exiting surface 111 of the light guide plate 110. For example, the scattering pattern 500 may be provided between the reflective layer 600 and the light guide plate 110. Light in the light guide plate 110 can be reflected by the reflective layer 600 to improve the emission rate of light emitted from the light exit surface 111 of the light guide plate 110.

For example, in at least one embodiment of the present disclosure, as shown in FIG. 6b, the backlight module further comprises an optical film layer 700 provided on the side of the curved light guide plate 110 on which the light exiting surface 111 is located. The optical film layer 700 may comprise, for example, a prism film, a diffusion film or the like to adjust the propagation angle of the light emitted from the light exit surface 111 of the light guide plate 110.

For example, in at least one embodiment of the present disclosure, as shown in FIG. 6b, the backlight module may further comprise a back plate 800 provided on the opposite side of the light exiting surface 111 of the light guide plate. For example, the back plate 800 may be provided on one side of the reflective layer 600 that is far away from the curved light guide plate 110. The back plate 800 can support the entire backlight module. The back plate 800 may be made of a material such as polyethylene p-benzoate.

At least one embodiment of the present disclosure further provides a display apparatus that may comprise the backlight module according to any embodiment described above.

Figure 7:
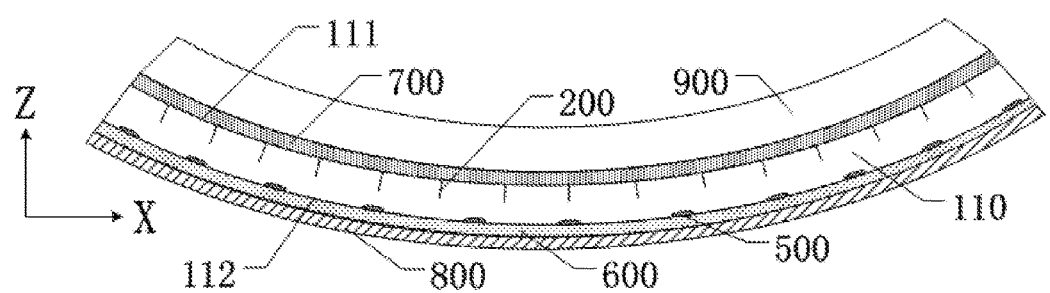
FIG. 7 is a sectional view of a display apparatus according to an embodiment of the present disclosure.

FIG. 7 is a sectional view of a display apparatus according to an embodiment of the present disclosure. As shown in FIG. 7, in at least one embodiment of the present disclosure, the display apparatus may further comprise a display panel 900 disposed on the light exiting side of the backlight module. The display apparatus for example is a concave display apparatus, and the display panel 900 may be provided on the concave surface of the backlight module.

One example of the display apparatus is a liquid crystal display apparatus, in which the display panel 900 may be a liquid crystal display panel including an array substrate and an opposite substrate. The array substrate and the opposite substrate are disposed opposite to each other to form a liquid-crystal cell, in which a liquid crystal material is filled. The opposite substrate is for example a color filter substrate. A pixel electrode of each pixel unit on the array substrate is used to apply an electric field to control the degree of rotation of the liquid crystal material to perform a display operation.

Another example of the display apparatus is an organic light-emitting diode (OLED) display apparatus. The display panel 900 in the display apparatus may be a OLED display panel, wherein stacked layers of organic light-emitting materials are formed on the array substrate of the display panel. An anode or cathode of each pixel unit is used to drive the organic light-emitting materials to emit light and perform a display operation.

A further example of the display apparatus is an electronic paper display apparatus in which the display panel 900 in the display apparatus may be an electronic paper display panel, in which a layer of electronic ink is formed on an array substrate in the display panel, and a pixel electrode of each pixel unit is used to apply a voltage for driving charged micro-particles in the electronic ink to move to perform a display operation.

At least one embodiment of the present disclosure provides a method for manufacturing a light guide plate, the light guide plate comprising two opposite main surfaces and a side surface located between the two main surfaces, wherein the method comprises: forming a plurality of grooves on at least one main surface of the light guide plate. Reference can be made to the contents of the above embodiments (the embodiments of the light guide plate) for the particular structure of the grooves, which will not be repeated herein.

Figure 8A:
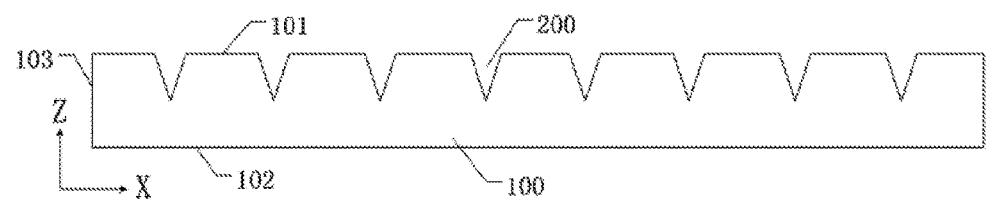
FIGS. 8a-8b are flow charts of a method for manufacturing the light guide plate according to an embodiment of the present disclosure.
Figure 8B:
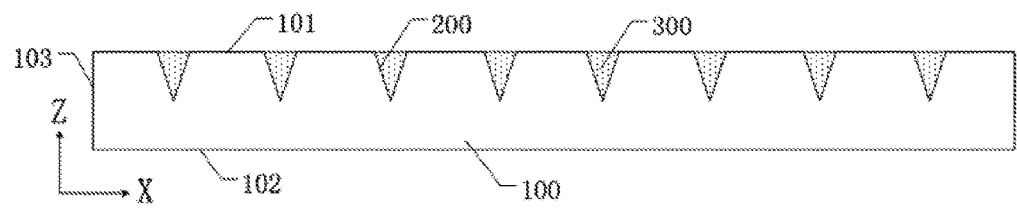

FIGS. 8a-8b are flow charts of a method for manufacturing the light guide plate according to an embodiment of the present disclosure.

Taking the curved light guide plate having the structure shown in FIG. 4 as an example, as shown in FIGS. 8a-8b, the method for manufacturing a light guide plate according to embodiments of the present disclosure comprise the following steps.

As shown in FIG. 8a, a light guide plate 100 is provided, which comprises two opposite main surfaces, i.e., a first main surface 101 and a second main surface 102, and a side surface 103 located between the first main surface 101 and the second main surface 102. Then, a plurality of grooves 200 are formed on the first main surface 101, for example.

For example, a plurality of grooves 200 may be formed on the first main surface 101 of the light guide plate 100 by hot pressing or cutting of cutter wheels.

As shown in FIG. 8b, a curable filling adhesive is provided on the first main surface 101 on which the grooves 200 are formed. Reference can be made to the contents of the above embodiments for the particular material of the filling adhesive 300, which will not be repeated herein.

Then, the filling adhesive is cured and the light guide plate 100 is bent to form a curved light guide plate 110, as shown in FIG. 4. For example, the first main surface 101 of the light guide plate 100 is formed as the concave surface 111 of the curved light guide plate 110, and the second main surface 102 of the light guide plate 100 is formed as the concave surface 112 of the curved light guide plate 110.

Note that there are many ways by which the light guide plate 100 shown in FIG. 8b may be formed as the curved light guide plate 110 shown in FIG. 4. A description will be given with an example in which a UV curing adhesive is used as the filling adhesive.

For example, in an embodiment of the present disclosure, curing the filling adhesive 300 and bending the light guide plate 100 to form a curved light guide plate may comprise: curing the filling adhesive 300 by ultraviolet rays for example and then bending the light guide plate 100 to form a curved light guide plate 111, wherein the filling adhesive 300 for example comprises an elastomeric material. Since the filling adhesive 300 comprises an elastomeric material, the curvature of the curved light guide plate 110 can be adjusted in a larger range, and only a smaller stress is produced in the curved light guide plate 100.

For example, in an embodiment of the present disclosure, curing the filling adhesive 300 and bending the light guide plate 100 to form a curved light guide plate 110 may further comprise: bending the light guide plate 100 to a required curvature in a state in which the filling adhesive 300 is uncured, and then curing the filling adhesive 300 by ultraviolet rays for example, to form the curved light guide plate 110. The filling adhesive 300 has a certain viscosity and can be bonded to the light guide plate 100. After the filling adhesive 300 is cured, the filling adhesive 300 may keep the shape of the curved light guide plate 110 unchanged. In this case, the stress generated by the curved light guide plate 110 is reduced and will not be released to the outside.

A light guide plate, its manufacturing method, and a backlight module are provided in embodiments of the present disclosure, capable of obtaining at least one of the following advantageous effects.

(1) At least one embodiment of the present disclosure provides a light guide plate with a plurality of grooves provided on a main surface thereof, which can reduce a stress produced by the light guide plate after it is bent, reduce the risk of scratching the light guide plate, and improve the display effect.

(2) In the light guide plate according to at least one embodiment of the present disclosure, the grooves of the light guide plate are filled with a filling adhesive, which can prevent the light guide plate from being broken by bending and can keep the curvature of the light guide plate unchanged after it is bent. In the case that the filling adhesive comprises an elastomeric material, the light guide plate is also adaptable to a larger change range of the curvature.

The following should be noted.

(1) The drawings of the embodiments of the present disclosure only relate to those structures mentioned in the embodiments of the present disclosure. For other structures, reference can be made to common designs thereof.

(2) For the sake of clarity, the thickness of a layer or region is scaled up or down in the drawings of the embodiments of the present disclosure. That is, the drawings are not drawn to actual proportions.

(3) without conflicts, the embodiments and the features of the embodiments of the present disclosure may be combined with each other to obtain new embodiments.

The disclosed above are only several specific embodiments of the present disclosure, however, the present disclosure is not limited to this. The protection scope of the present disclosure shall be subject to the protection scope defined by the claims.

What is claimed is:

1. A method for manufacturing a light guide plate, the light guide plate comprising two opposite main surfaces and a side surface located between the two main surfaces, wherein the method comprises:
    forming a plurality of grooves on at least one of the main surfaces of the light guide plate;
    forming a curable filling adhesive on the at least one of the main surfaces on which the grooves are formed, wherein the grooves are at least partially filled with the filling adhesive; and
    curing the filling adhesive and bending the light guide plate to form a curved light guide plate,
    wherein one of the main surfaces of the light guide plate forms a concave surface of the curved light guide plate and another of the main surfaces of the light guide plate forms a convex surface of the curved light guide plate.

2. The method according to claim 1, wherein curing the filling adhesive and bending the light guide plate to form a curved light guide plate comprises:
    bending the light guide plate after curing the filling adhesive to form the curved light guide plate,
    wherein the filling adhesive comprises an elastomeric material.

3. The method according to claim 1, wherein curing the filling adhesive and bending the light guide plate to form a curved light guide plate comprises:
    curing the filling adhesive after bending the light guide plate to form the curved light guide plate.

4. The method according to claim 1, wherein
    the grooves are formed on at least one of: the concave surface of the curved light guide plate, or the convex surface of the curved light guide plate.

5. The method according to claim 1, wherein
    a difference in refractive index between the light guide plate and the filling adhesive is not greater than 0.1.

6. The method according to claim 1, wherein the plurality of grooves includes a first groove, and
    in a direction perpendicular to one of the main surfaces, a ratio of a depth of the first groove to a thickness of the light guide plate is $\frac{1}{3}$ to $\frac{2}{3}$.

7. The method according to claim 1, wherein the curable filling adhesive is a UV curing adhesive or a heat curing adhesive.

8. A light guide plate manufactured according to the method of claim 1 wherein the filling adhesive is provided on the at least one of the main surfaces of the light guide plate on which the grooves are formed, and the grooves are at least partially filled with the filling adhesive.

9. The light guide plate according to claim 8, wherein the filling adhesive comprises an elastomeric material.

10. The light guide plate according to claim 8, wherein the plurality of grooves includes a first groove, and at least one of:
    in a direction perpendicular to one of the main surfaces of the light guide plate, a cross section of the first groove is in a V-shape, a trapezoid or a rectangle shape, or a combination thereof; or
    in a direction parallel to the one of the main surfaces of the light guide plate, the first groove extends in a straight line or a curve shape.

11. A backlight module, comprising:
    a light source; and
    the light guide plate according to claim 8,
    wherein the plurality of grooves includes a first groove, and the light source is disposed opposite to a side surface of the light guide plate, and opposite to a cross section of the first groove, the cross section of the first groove being a cross section of the first groove in a direction perpendicular to an extension direction of the light guide plate on the at least one of the main surfaces.

12. The backlight module according to claim 11, wherein the light guide plate further comprises:
    a filling adhesive,
    wherein the filling adhesive is provided on the at least one of the main surfaces of the light guide plate on which the grooves are formed, and the grooves are at least partially filled with the filling adhesive.

13. The backlight module according to claim 12, wherein the filling adhesive comprises an elastomeric material.

14. The backlight module according to claim 11, further comprising:
    a scattering pattern provided on one of the main surfaces opposite to a light exiting surface of the light guide plate.

15. The backlight module according to claim 11, further comprising:
    a reflective layer provided on the one of the main surfaces opposite to a light exiting surface of the light guide plate.

16. The backlight module according to claim 11, further comprising:
    an optical film layer provided on the side of the curved light guide plate on which a light exiting surface is located.

* * * * *